(12) United States Patent
Okada

(10) Patent No.: US 10,768,046 B2
(45) Date of Patent: Sep. 8, 2020

(54) SPECTROMETRY DEVICE

(71) Applicant: YOKOGAWA ELECTRIC CORPORATION, Tokyo (JP)

(72) Inventor: Masanori Okada, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/460,198

(22) Filed: Jul. 2, 2019

(65) Prior Publication Data

US 2020/0018645 A1 Jan. 16, 2020

(30) Foreign Application Priority Data

Jul. 13, 2018 (JP) .................. 2018-133647

(51) Int. Cl.
G01J 3/02 (2006.01)
G01J 3/10 (2006.01)
G01J 3/42 (2006.01)
G01N 21/31 (2006.01)

(52) U.S. Cl.
CPC .............. *G01J 3/027* (2013.01); *G01J 3/10* (2013.01); *G01J 3/42* (2013.01); *G01N 21/31* (2013.01)

(58) Field of Classification Search
CPC ............ G01J 3/027; G01J 3/10; G01N 21/31
See application file for complete search history.

(56) References Cited

U.S. PATENT DOCUMENTS

2009/0164138 A1 6/2009 Goto et al.
2011/0108720 A1* 5/2011 Ford .................. G01J 3/02
250/262

FOREIGN PATENT DOCUMENTS

JP 2015-137910 A 7/2015

* cited by examiner

*Primary Examiner* — Jamil Ahmed
(74) *Attorney, Agent, or Firm* — Osha Liang LLP

(57) ABSTRACT

A spectrometry device includes a first converter that processes a reception signal based on an irradiation light from a first emitter, a second converter that processes a reception signal based on an irradiation light from a second emitter, and a controller that controls the first emitter and the second emitter. The reception signal based on the irradiation light irradiated from the first emitter includes a first reception signal and a second reception signal that each include information that relates to an optical spectrum. When the controller stops the operation of the second emitter, the first converter converts the first reception signal into a first digital signal and the second converter converts the second reception signal into a second digital signal.

13 Claims, 5 Drawing Sheets

SPECTROMETRY DEVICE

CROSS-REFERENCE TO RELATED APPLICATIONS

This application is based on and claims priority under 35 U.S.C. § 119 from Japanese Patent Application No. 2018-133647 filed on Jul. 13, 2018, the contents of which are incorporated herein by reference.

BACKGROUND

Technical Field

The present invention generally relates to a spectrometry device.

Related Art

Conventional technologies of spectroscopically acquiring information relating to an analysis target based on an optical spectrum such as an absorption spectrum are known.

For example, patent literature 1 discloses an insertable gas-concentration measuring device that can simultaneously analyze with one device two types of gas components of different analytical wavelengths using two light sources and two photodetectors respectively corresponding to the two light sources.

Patent Literature 1: Japanese Patent Application Publication No. 2015-137910

Such a spectrometry device may further have reference cells for detecting wavelength positions of the absorption-spectrum peaks of the analysis-target components and photodetectors for reference lights transmitted through the reference cells. That is, for each of the two types of gas components, a pair of photodetectors is disposed—one for the measurement light and one for the reference light—such that the spectrometry device has a total of four photodetectors.

At this time, when each photodetector is connected with a conversion unit that converts a reception signal output from the photodetector from an analog signal into a digital signal, product costs increase and a circuit system for processing the reception signals becomes complex.

SUMMARY

One or more embodiments provide a spectrometry device that can reduce product costs even in a situation where two emission units are each disposed with a plurality of reception units.

A spectrometry device according to one or more embodiments includes a first conversion unit that processes a reception signal based on an irradiation light irradiated from a first emission unit, a second conversion unit that processes a reception signal based on an irradiation light irradiated from a second emission unit, and a control unit that controls operations of the first emission unit and the second emission unit. The reception signal based on the irradiation light irradiated from the first emission unit includes a first reception signal and a second reception signal that each include information relating to an optical spectrum. When the control unit stops the operation of the second emission unit, the first conversion unit converts the first reception signal into a digital signal and the second conversion unit converts the second reception signal into a digital signal. According to such a spectrometry device, product costs can be reduced even in a situation where two emission units are each provided with a plurality of reception units. More specifically, with the spectrometry device, because the reception signals can be processed using only the first conversion unit and the second conversion unit, a number of conversion-unit-related circuit components is reduced compared to the prior art, which requires four conversion units.

In a spectrometry device according to one or more embodiments, when the first conversion unit converts the first reception signal into the digital signal only for the first time period, the control unit may analyze the optical spectrum based on the first reception signal converted during the first time period. This enables analysis of the optical spectrum based on the first reception signal using the information relating to the optical spectrum repeatedly included during the first time period. Therefore, by executing signal processing such as averaging, a precision of analysis using the optical spectrum improves.

In a spectrometry device according to one or more embodiments, when the second conversion unit converts the second reception signal into the digital signal only for the second time period, the control unit may analyze the optical spectrum based on the second reception signal converted during the second time period. This enables analysis of the optical spectrum based on the second reception signal using the information relating to the optical spectrum repeatedly included during the second time period. Therefore, by executing signal processing such as averaging, a precision of analysis using the optical spectrum improves.

In a spectrometry device according to one or more embodiments, the first time period and the second time period may be identical to each other. This enables the spectrometry device to perform analyses of the optical spectra based on the first reception signal and the second reception signal in parallel at the same timing. Therefore, these reception signals are easily processed compared to a situation of analyzing the optical spectra at mutually different timings.

In a spectrometry device according to one or more embodiments, further provided may be a switching unit that switches a circuit so the first conversion unit alternately converts the first reception signal and the second reception signal into the digital signals when the control unit starts the operation of the second emission unit. This enables a circuit on a reception side to be switched between a situation where both the first emission unit and the second emission unit are operating and a situation where the operation of one among the first emission unit and the second emission unit is stopped. As such, in each situation, conditions where components on the reception side are not used are avoided and the components are used effectively.

In a spectrometry device according to one or more embodiments, the first reception signal may include information relating to an absorption spectrum of an analysis-target component in a gas to be measured and the second reception signal may include information on an absorption spectrum of a gas that is identical to the analysis-target component in the gas to be measured and has a known concentration. For example, in another spectrometry method such as fluorescence spectrometry or Raman spectrometry, an intensity of a measurement light of a fluorescent light or a Raman light is weak and the measurement light is not easily detected. In contrast, by using an absorption spectrometry method, the intensity of the measurement light is increased and the measurement light is easily detected. Therefore, the spectrometry device can easily calculate an optical spectrum.

In one or more embodiments, a spectrometry device includes a first converter that processes a reception signal based on an irradiation light irradiated from a first emitter, a second converter that processes a reception signal based on an irradiation light irradiated from a second emitter, and a controller that controls operations of the first emitter and the second emitter. The reception signal based on the irradiation light irradiated from the first emitter includes a first reception signal and a second reception signal that each include information relating to an optical spectrum. When the controller stops the operation of the second emitter, the first converter converts the first reception signal into a digital signal and the second converter converts the second reception signal into a digital signal.

According to one or more embodiments of the present invention, a spectrometry device can be provided that can reduce product costs even in a situation where two emission units are each disposed with a plurality of reception units.

DETAILED DESCRIPTION

Figure 1:
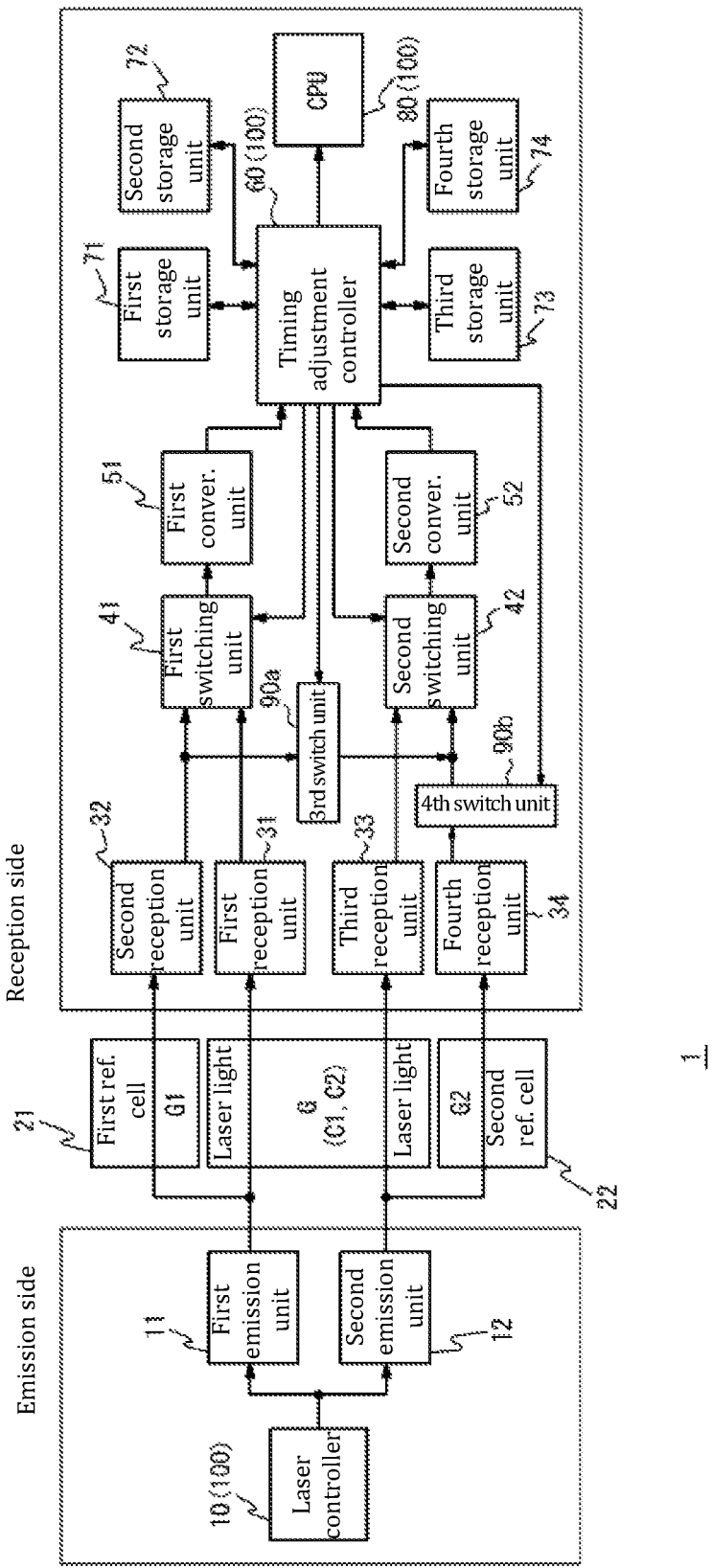
FIG. 1 is a block diagram illustrating one example of a spectrometry device according to one or more embodiments.

Embodiments of the present invention will be described after a brief discussion of conventional art.

A laser gas analyzer is directly installed to a flow path wherein a gas to be measured such as a process gas flows, and concentration analysis of an analysis-target component is performed. The gas to be measured includes gas molecules of, for example, CO (carbon monoxide), CO2 (carbon dioxide), H2O (water), CnHm (a hydrocarbon), NH3 (ammonia), and O2 (oxygen). The flow path includes piping, a flue, a combustion furnace, and the like.

Such a laser gas analyzer includes, for example, a TDLAS (tunable diode laser absorption spectroscopy) laser gas analyzer. A TDLAS laser gas analyzer analyzes the concentration of the analysis-target component by, for example, irradiating a laser light into the gas to be measured.

The gas molecules included in the gas to be measured exhibit an absorption spectrum based on molecular vibration and molecular rotational-energy transitioning in an infrared to near-infrared region. The absorption spectrum is specific to the component molecules. According to the Beer-Lambert law, an absorbance of the laser light by the gas molecules is proportional to the component concentration thereof and an optical-path length. Therefore, the concentration of the analysis-target component can be analyzed by measuring an intensity of the absorption spectrum.

In TDLAS, a semiconductor laser light of a linewidth sufficiently narrower than an energy-transition absorption linewidth had by the gas molecules is irradiated to the gas to be measured. By subjecting an injection current of the semiconductor laser to high-speed modulation, an emission wavelength thereof is swept. By measuring an intensity of the semiconductor laser light transmitted through the gas to be measured, one independent absorption spectrum is measured.

A sweeping range of the semiconductor laser light differs according to use. In a situation where the analysis-target component is O2, the linewidth of the semiconductor laser light is, for example, 0.0002 nm and a sweeping width is, for example, 0.1 to 0.2 nm. The absorption spectrum is measured by sweeping the sweeping width of 0.1 to 0.2 nm. The concentration of the analysis-target component is sought by performing a concentration conversion from the acquired one absorption spectrum. A method of the concentration conversion includes known methods such as a peak-height method, a spectrum-area method, and a 2f method.

Generally, an emission wavelength of a semiconductor laser depends on an injection current and a temperature of the semiconductor laser. For example, the emission wavelength becomes longer the greater the injection current. For example, the emission wavelength becomes longer the higher the temperature.

In performing measurement by TDLAS, a temperature of the semiconductor laser is adjusted so the emission wavelength of the semiconductor laser roughly matches a wavelength band of the absorption spectrum that is wanting to be measured. The temperature of the semiconductor laser is maintained at the adjusted value. Afterward, the injection current of the semiconductor laser is changed to perform fine adjustment of the emission wavelength.

Here, a conventional method of measuring the absorption spectrum of the gas to be measured by repeatedly sweeping the emission wavelength of the semiconductor laser is described with reference to FIGS. 4A to 4C.

Figure 4A:
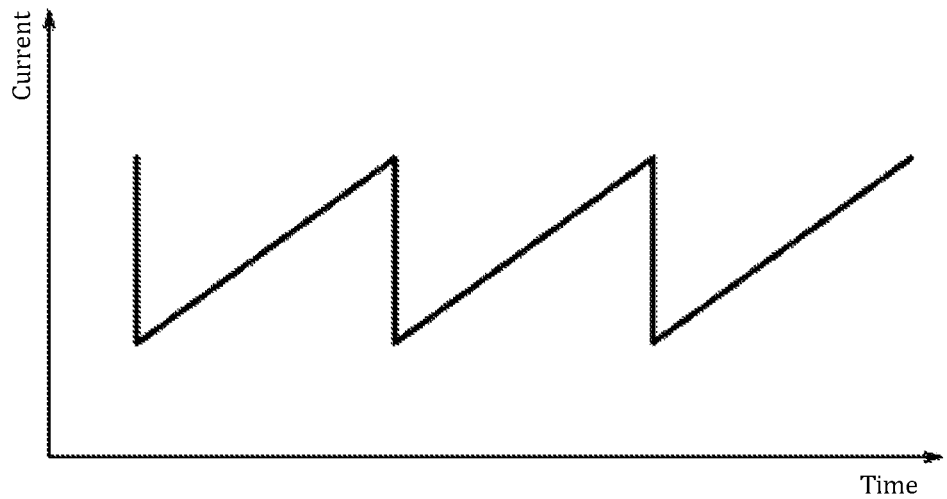
FIG. 4A is a schematic diagram illustrating an injection current of a repeatedly swept semiconductor laser.

FIG. 4A is a schematic diagram illustrating the injection current of the repeatedly swept semiconductor laser. When the emission wavelength of the semiconductor laser matches the wavelength band of the absorption spectrum wanting to be measured, the emission wavelength of the semiconductor laser is repeatedly swept in this wavelength band. At this time, the injection current of the semiconductor laser is repeatedly swept. For example, the injection current of the semiconductor laser exhibits a sawtooth waveform.

Figure 4B:
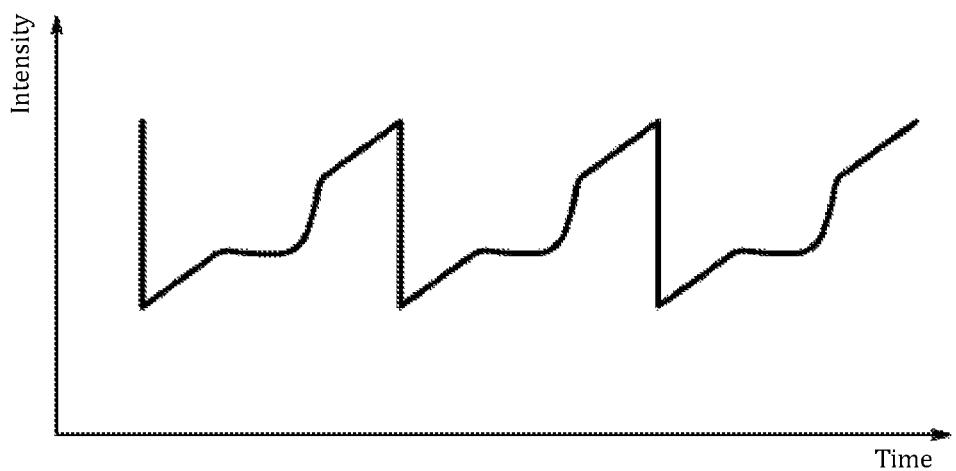
FIG. 4B is a schematic diagram illustrating a change in an intensity of a semiconductor laser light transmitted through a gas to be measured.
Figure 4C:
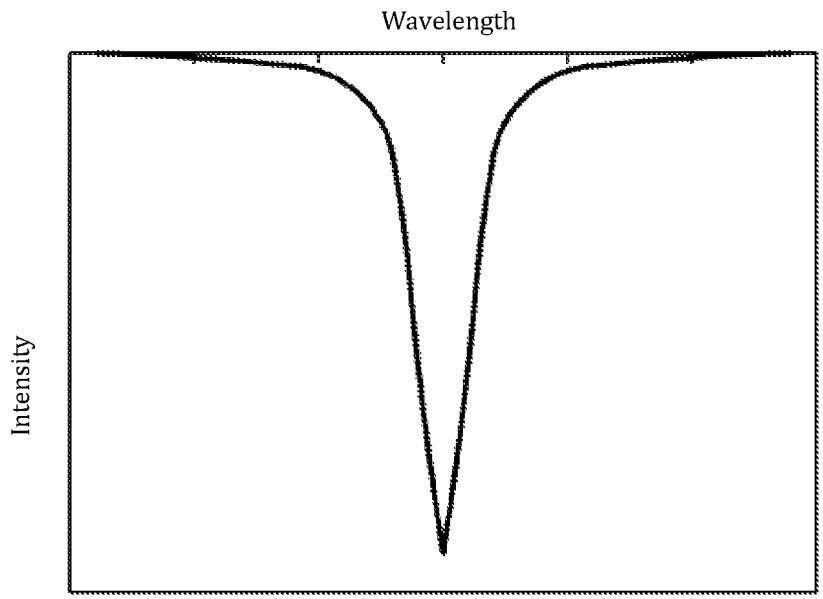
FIG. 4C is a schematic diagram illustrating a calculated absorption spectrum of the gas to be measured.

FIG. 4B is a schematic diagram illustrating a change in the intensity of the semiconductor laser light transmitted through the gas to be measured. The semiconductor laser light whose emission wavelength is repeatedly swept is transmitted through the gas to be measured and condensed to a reception unit. The reception unit outputs a reception signal such as that illustrated in FIG. 4B that reflects a light absorption amount of the gas to be measured at each wavelength of the semiconductor laser light. At this time, the irradiation intensity of the semiconductor laser light also changes in conjunction with the sweeping of the injection current of the semiconductor laser. For example, the irradiation intensity becomes higher the greater the injection current. Therefore, based on the change in the irradiation intensity accompanying the sweeping of the injection current and the change in the light absorption amount of the gas to be measured at each wavelength, the reception signal output from the light receiving unit exhibits a waveform where a dip is superimposed on a sawtooth waveform.

Then, based on the reception signal illustrated in FIG. 4B, the absorption spectrum of the gas to be measured is calculated. FIG. 4C is a schematic diagram illustrating the calculated absorption spectrum of the gas to be measured. The absorption spectrum is calculated by, for example, subtracting a reception signal of a situation where the semiconductor laser light is not transmitted through the gas to be measured from the reception signal of the situation where the semiconductor laser light is transmitted through the gas to be measured and making the vertical axis a logarithm. An absorbance exhibited by such an absorption spectrum is proportional to the component concentration of the gas to be measured. For example, an area of the absorption spectrum is proportional to the component concentration of the gas to be measured. Therefore, the component concentration of the gas to be measured can be calculated based on the absorbance.

Figure 5:
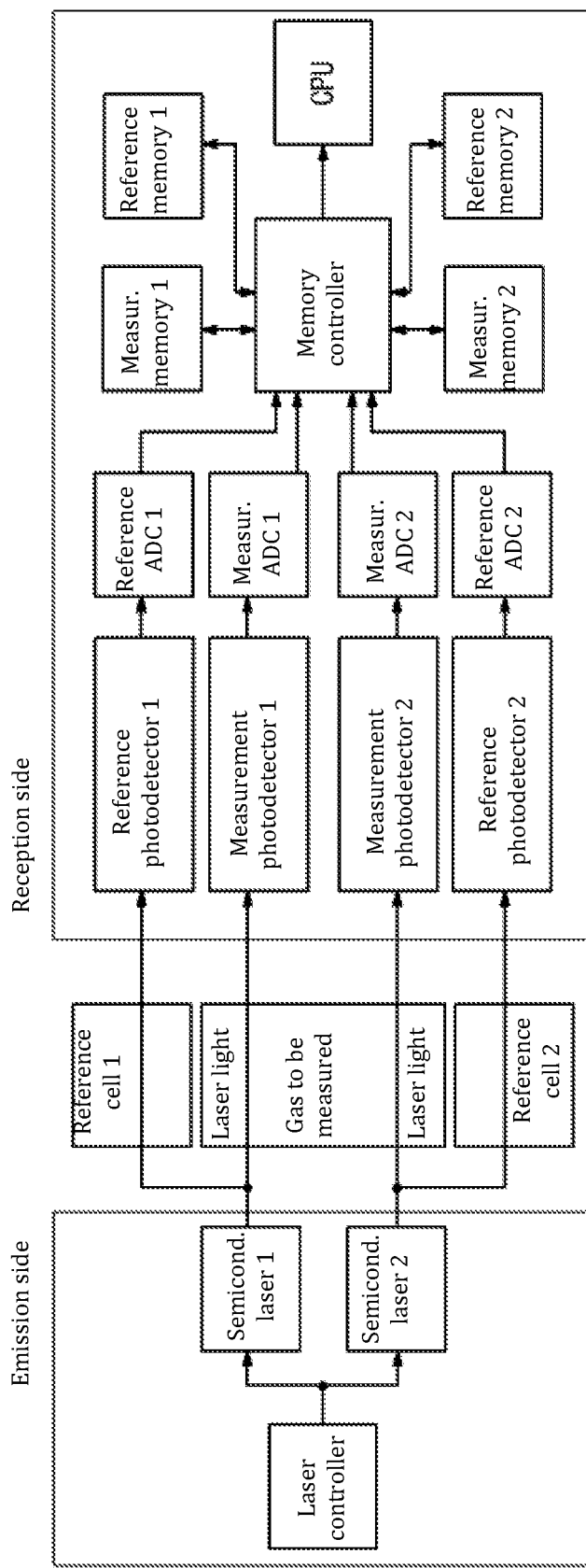
FIG. 5 is a block diagram illustrating a conventional spectrometry device used in spectrometry of two types of analysis-target components of different analytical wavelengths.

FIG. 5 is a block diagram illustrating a conventional spectrometry device used in spectrometry of two types of analysis-target components of different analytical wavelengths.

Conventionally, two semiconductor lasers are used to perform spectrometry on two types of analysis-target components of different analytical wavelengths. An irradiation light irradiated from one semiconductor laser is split into two. One split irradiation light is transmitted through the gas to be measured and detected by a measurement photodetector as a measurement light. The other split irradiation light is transmitted through a reference cell and detected by a reference photodetector as a reference light.

A circuit system configuring a reception side has the measurement photodetector, a measurement ADC (analog/digital converter), and a measurement memory and the reference photodetector, a reference ADC, and a reference memory for each semiconductor laser. In this manner, each photodetector is connected with an ADC that converts a reception signal output from the photodetector from an analog signal into a digital signal. With the conventional spectrometry device, which requires four ADCs for four photodetectors, product costs increase and the circuit system for processing the reception signals becomes complex.

One or more embodiments provide a spectrometry device 1 that can reduce product costs even in a situation where two emission units are each disposed with a plurality of reception units. One or more embodiments will be mainly described below while referring to the included drawings.

FIG. 1 is a block diagram illustrating one example of a configuration of the spectrometry device 1 according to one or more embodiments. The spectrometry device 1 can irradiate two types of irradiation lights of different wavelength bands in parallel to a gas G to be measured and, based on reception signals processed in different reception circuits, analyze in parallel different analysis-target components in the gas G to be measured. First, a configuration and function of the spectrometry device 1 in a situation of analyzing different analysis-target components in parallel is mainly described.

As illustrated in FIG. 1, the spectrometry device 1 has a laser controller 10, a first emission unit 11 (first emitter), and a second emission unit 12 (second emitter) that configure an emission side.

The laser controller 10 configures a portion of a control unit 100 (controller) of the spectrometry device 1 that is described below. The laser controller 10 is connected to the first emission unit 11 and the second emission unit 12 and controls operations thereof. For example, the laser controller 10 generates an emission-wavelength control signal and controls emission wavelengths of irradiation lights respectively irradiated from the first emission unit 11 and the second emission unit 12. The laser controller 10 additionally controls, for example, turning respective irradiation by the first emission unit 11 and the second emission unit 12 on and off, irradiation intensities, and the like.

The first emission unit 11 and the second emission unit 12 each have, for example, any light source that can measure the gas G to be measured by TDLAS. The gas G to be measured includes gas molecules of, for example, CO, $CO_2$, $H_2O$, CnHm, $NH_3$, and $O_2$. Each emission unit has, for example, a semiconductor laser. Based on an injection current output from the laser controller 10, each emission unit irradiates a light whose emission wavelength is swept to the gas G to be measured. At this time, each emission unit may irradiate a light whose emission wavelength is swept in the same wavelength range over a plurality of periods. The emission wavelength of the first emission unit 11 and the emission wavelength of the second emission unit 12 respectively correspond to analytical wavelengths of two types of different analysis-target components C1 and C2 included in the gas G to be measured and are different from each other.

The spectrometry device 1 further has a first reference cell 21. The irradiation light irradiated from the first emission unit 11 is split into two. One split irradiation light is transmitted through the gas G to be measured. The other split irradiation light is transmitted through a gas G1 that is enclosed in the first reference cell 21, is identical to the analysis-target component C1 in the gas G to be measured, and has a known concentration.

The spectrometry device 1 further has a second reference cell 22. The irradiation light irradiated from the second emission unit 12 is split into two. One split irradiation light is transmitted through the gas G to be measured. The other split irradiation light is transmitted through a gas G2 that is enclosed in the second reference cell 22, is identical to the analysis-target component C2 in the gas G to be measured, and has a known concentration.

The spectrometry device 1 has components configuring a reception side. For example, the spectrometry device 1 has a first reception unit 31, a second reception unit 32, a third reception unit 33, and a fourth reception unit 34; a first switching unit 41 (first switch) and a second switching unit 42 (second switch); and a first conversion unit 51 (first converter) and a second conversion unit 52 (second converter). The spectrometry device 1 further has a timing adjustment controller 60; a first storage unit 71, a second storage unit 72, a third storage unit 73, and a fourth storage unit 74; and a CPU (central processing unit) 80. Together with the above laser controller 10, the timing adjustment controller 60 and the CPU 80 configure the control unit 100 of the spectrometry device 1.

The first reception unit 31 and the third reception unit 33 each have, for example, any photodetector that can measure the gas G to be measured by TDLAS. Each reception unit has, for example, a photodiode. Each reception unit detects and converts into an electrical measurement signal a measurement light including information relating to an optical spectrum of the gas G to be measured. The optical spectrum includes, for example, an absorption spectrum.

The second reception unit 32 and the fourth reception unit 34 have, for example, any photodetector that can respectively measure the gas G1 and the gas G2 enclosed in the first reference cell 21 and the second reference cell 22 by TDLAS. Each reception unit has, for example, a photodiode. Each reception unit detects and converts into an electrical reference signal a reference light including information relating to an optical spectrum of each gas enclosed in the reference cells. The optical spectrum includes, for example, an absorption spectrum.

The first reception unit 31 detects the portion of the irradiated light that is irradiated from the first emission unit 11 and transmitted through the gas G to be measured as the measurement light. When the first reception unit 31 detects the measurement light, the first reception unit 31 outputs a first reception signal S1 including information relating to an optical spectrum of the analysis-target component C1. The second reception unit 32 detects the portion of the irradiated light that is irradiated from the first emission unit 11 and transmitted through the first reference cell 21 as the reference light. When the second reception unit 32 detects the reference light, the second reception unit 32 outputs a second reception signal S2 including information relating to the optical spectrum of the gas G1.

Likewise, the third reception unit 33 detects the portion of the irradiated light that is irradiated from the second emission unit 12 and transmitted through the gas G to be measured as the measurement light. When the third reception unit 33 detects the measurement light, the third reception unit 33 outputs a third reception signal S3 including information relating to an optical spectrum of the analysis-target component C2. The fourth reception unit 34 detects the portion of the irradiated light that is irradiated from the second emission unit 12 and transmitted through the second reference cell 22 as the reference light. When the fourth reception unit 34 detects the reference light, the fourth reception unit 34 outputs a fourth reception signal S4 including information relating to the optical spectrum of the gas G2.

The first switching unit 41 has any signal switching circuit such as a switch. The first switching unit 41 is connected to the first reception unit 31 and the second reception unit 32. The first switching unit 41 acquires the first reception signal S1 and the second reception signal S2 respectively output from the first reception unit 31 and the second reception unit 32. Based on control by the timing adjustment controller 60 of the control unit 100, the first switching unit 41 switches between output of the first reception signal S1 and output of the second reception signal S2.

Likewise, the second switching unit 42 has any signal switching circuit such as a switch. The second switching unit 42 is connected to the third reception unit 33 and the fourth reception unit 34. The second switching unit 42 acquires the third reception signal S3 and the fourth reception signal S4 respectively output from the third reception unit 33 and the fourth reception unit 34. Based on control by the timing adjustment controller 60 of the control unit 100, the second switching unit 42 switches between output of the third reception signal S3 and output of the fourth reception signal S4.

The first conversion unit 51 has, for example, an ADC. The first conversion unit 51 is connected to the first switching unit 41. The first conversion unit 51 converts the first reception signal S1 or the second reception signal S2 output from the first switching unit 41 from an analog signal into a digital signal.

Likewise, the second conversion unit 52 has, for example, an ADC. The second conversion unit 52 is connected to the second switching unit 42. The second conversion unit 52 converts the third reception signal S3 or the fourth reception signal S4 output from the second switching unit 42 from an analog signal into a digital signal.

The timing adjustment controller 60 is connected to the first conversion unit 51 and the second conversion unit 52.

The timing adjustment controller 60 acquires the first reception signal S1 or the second reception signal S2 output from the first conversion unit 51. Likewise, the timing adjustment controller 60 acquires the third reception signal S3 or the fourth reception signal S4 output from the second conversion unit 52.

The timing adjustment controller 60 is also connected to the first switching unit 41. The timing adjustment controller 60 controls an output time, a timing, and the like of the first reception signal S1 or the second reception signal S2 output from the first switching unit 41 to the first conversion unit 51 and outputs the first reception signal S1 or the second reception signal S2 to the first conversion unit 51 in a time-divided state.

Likewise, the timing adjustment controller 60 is also connected to the second switching unit 42. The timing adjustment controller 60 controls an output time, a timing, and the like of the third reception signal S3 or the fourth reception signal S4 output from the second switching unit 42 to the second conversion unit 52 and outputs the third reception signal S3 or the fourth reception signal S4 to the second conversion unit 52 in a time-divided state.

The first storage unit 71, the second storage unit 72, the third storage unit 73, and the fourth storage unit 74 are connected to the timing adjustment controller 60. Each storage unit has any storage device such as an HDD (hard disk drive), an SSD (solid-state drive), an EEPROM (electrically erasable programmable read-only memory), a ROM (read-only memory), or a RAM (random access memory). Each storage unit may function as, for example, a main storage device, an auxiliary storage device, or a cache memory. Each storage unit is not limited to being built into the spectrometry device 1 and may be an external storage device connected by, for example, a digital input/output port such as a USB port.

The first storage unit 71 stores, as necessary, data based on the first reception signal S1 digitized by the first conversion unit 51. The second storage unit 72 stores, as necessary, data based on the second reception signal S2 digitized by the first conversion unit 51. The third storage unit 73 stores, as necessary, data based on the third reception signal S3 digitized by the second conversion unit 52. The fourth storage unit 74 stores, as necessary, data based on the fourth reception signal S4 digitized by the second conversion unit 52.

The CPU 80 is connected to the first storage unit 71, the second storage unit 72, the third storage unit 73, and the fourth storage unit 74 via the timing adjustment controller 60. The CPU 80 determines, for example, whether a data acquisition time period based on each reception signal by the timing adjustment controller 60 is arrived at a predetermined time that includes a defined sweeping count. When the CPU 80 determines that the data acquisition time is arrived at the predetermined time, the CPU 80 acquires the data from the corresponding storage unit and analyzes the optical spectrum based on the corresponding reception signal.

The CPU 80 subjects the acquired reception signal to any signal processing. For example, the CPU 80 may average the acquired reception signal over a plurality of periods. Averaging signifies adding signal strengths of the same wavelength portion of the sweeping waveform for each period and dividing by a total sweeping count. The CPU 80 may calculate the absorption spectrum from the acquired reception signal in this manner.

The control unit 100 that includes the laser controller 10, the timing adjustment controller 60, and the CPU 80 includes one or more processors. More specifically, the control unit 100 includes any processor such as a dedicated processor that can realize various types of control, processing, and the like by the above laser controller 10, timing adjustment controller 60, and CPU 80. In the control unit 100, the laser controller 10 and the timing adjustment controller 60 are configured as the same device and the CPU 80 is configured as a different device. Not being limited thereto, the control unit 100 may be configured in any way by any number of devices.

The control unit 100 is connected to each component that is controlled by the spectrometry device 1, controlling and managing these components. For example, the laser controller 10 is connected to the first emission unit 11 and the second emission unit 12, controlling and managing such. For example, the timing adjustment controller 60 is connected to the first switching unit 41 and the second switching unit 42 and the first storage unit 71, the second storage unit 72, the third storage unit 73, and the fourth storage unit 74, controlling and managing such.

The control unit 100 executes the signal processing as necessary based on the acquired data and analyzes the optical spectrum. For example, the CPU 80 is connected to each storage unit via the timing adjustment controller 60, acquires the data from the corresponding storage unit, processes the corresponding reception signal, and analyzes the calculated absorption spectrum.

Figure 2:
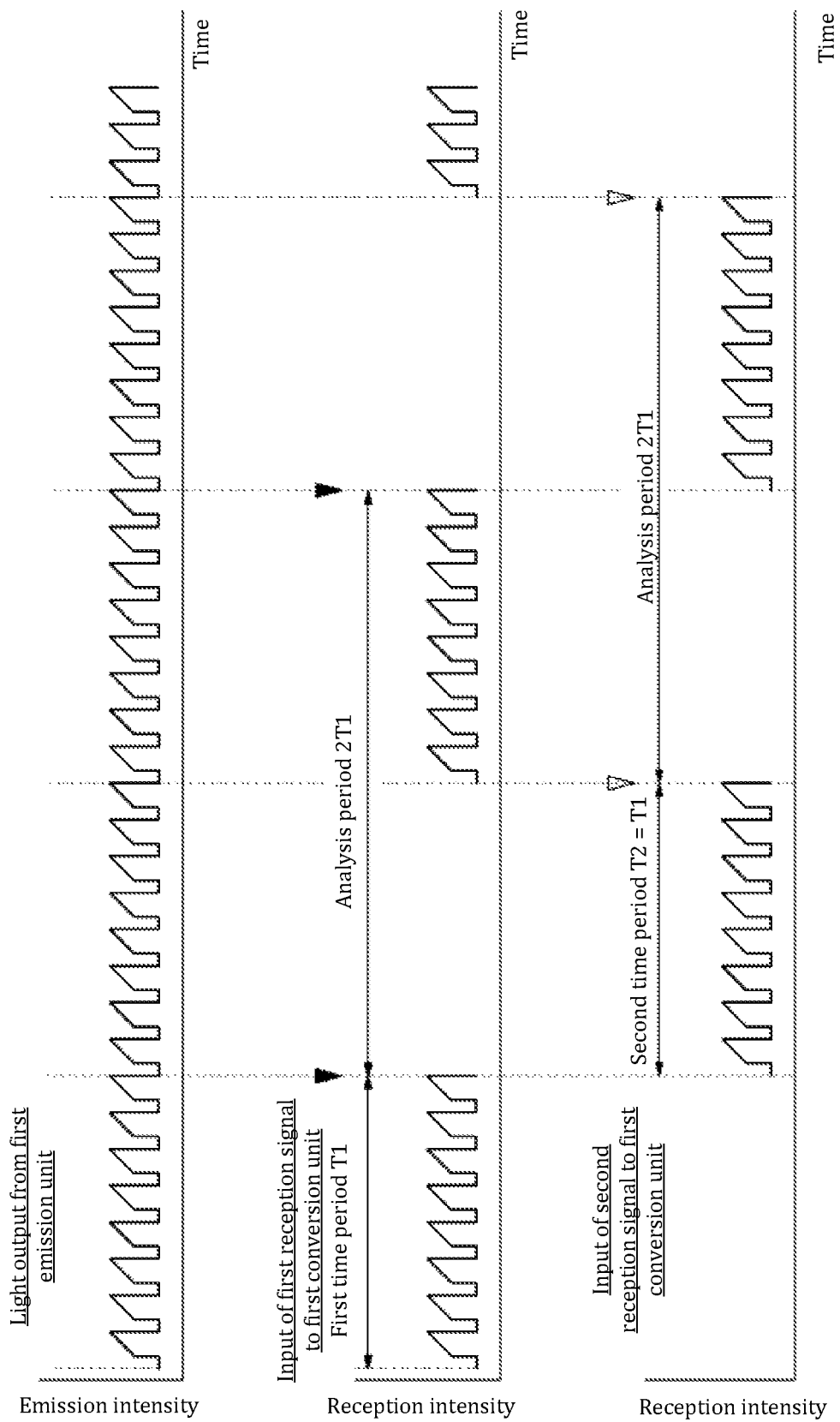
FIG. 2 is a schematic diagram illustrating a first example of control and processing executed by a control unit.

Next, the controls and processes executed by the control unit 100—for example, the timing adjustment controller 60 and the CPU 80—in a situation of analyzing the different analysis-target components C1 and C2 in parallel are mainly described while referring to FIG. 2.

FIG. 2 is a schematic diagram illustrating a first example of the control and processing executed by the control unit 100. In FIG. 2, the horizontal axis indicates time. In FIG. 2, illustration of the third reception signal S3 and the fourth reception signal S4 input to the second conversion unit 52 is omitted and the first reception signal S1 and the second reception signal S2 input to the first conversion unit 51 are mainly illustrated. However, a description similar to what is described below using FIG. 2 applies to the third reception signal S3 and the fourth reception signal S4.

The upper graph in FIG. 2 illustrates change over time in the light output from the first emission unit 11. This graph illustrates the emission wavelength of the irradiation light from the first emission unit 11 being swept in a certain wavelength range over a plurality of periods and the emission intensity monotonically changing each period by such wavelength sweeping. The center graph in FIG. 2 illustrates change over time in the input of the first reception signal S1 to the first conversion unit 51. The lower graph in FIG. 2 illustrates change over time in the input of the second reception signal S2 to the first conversion unit 51. Although the center and lower graphs in FIG. 2 illustrate the reception intensity increasing linearly each period by omitting, for convenience, change in the reception intensity based on the absorption spectrum, what is actually exhibited is a waveform such as that illustrated in FIG. 4B where a dip based on the absorption spectrum is superimposed.

Here, as above, the emission intensity changes in conjunction with, for example, the sweeping of the injection current of the semiconductor laser. That is, the change in the emission intensity in FIG. 2 may correspond to the change in the injection current. However, not being limited thereto, the change in the emission intensity may correspond to the change in a sweeping voltage input to any wavelength sweeping mechanism controlled by voltage. Likewise, the change in the reception intensity may correspond to change in a current or change in a voltage according to an output form of the signal by each reception unit.

The control unit 100—for example, the timing adjustment controller 60—controls the first switching unit 41 so the first reception signal S1 is repeatedly input to the first conversion unit 51 only during a first time period T1 (first time period). When a time elapsed from the output from the first switching unit 41 switching to the first reception signal S1 reaches the first time period T1, the CPU 80 analyzes the optical spectrum based on the first reception signal S1 converted by the first conversion unit 51 during the first time period T1. More specifically, when the timing adjustment controller 60 acquires the first reception signal S1 converted into the digital signal by the first conversion unit 51 only during the first time period T1, the CPU 80 analyzes the absorption spectrum of the analysis-target component C1 based on the acquired first reception signal S1 at the timing indicated by the black upside-down triangle in FIG. 2.

The timing adjustment controller 60 controls the first switching unit 41 to switch from outputting the first reception signal S1 to outputting the second reception signal S2.

The timing adjustment controller 60 controls the first switching unit 41 so the second reception signal S2 is repeatedly input to the first conversion unit 51 only during a second time period T2 (second time period). When the timing adjustment controller 60 acquires the second reception signal S2 converted into the digital signal by the first conversion unit 51 only during the second time period T2, the CPU 80 analyzes the absorption spectrum of the gas G1 based on the acquired second reception signal S2 at the timing indicated by the white upside-down triangle in FIG. 2.

In the first example illustrated in FIG. 2, the timing adjustment controller 60 controls the first switching unit 41 so the first time period T1 and the second time period T2 are identical.

The timing adjustment controller 60 again controls the first switching unit 41 to switch from outputting the second reception signal S2 to outputting the first reception signal S1. Afterward, the timing adjustment controller 60 and the CPU 80 repeat the above control and processing. In the first example illustrated in FIG. 2, because the first time period T1 and the second time period T2 are identical, an analysis period of analyzing the absorption spectrum of the analysis-target component C1 and an analysis period of analyzing the absorption spectrum of the gas G1 each become 2T1 and are identical to each other.

Here, with each sweeping period, because a general reception signal has a very low signal strength and a low SN ratio, sweeping needs to be repeated several thousand times. So that the same SN ratio is obtained for the above measurement signal and reference signal in the optical spectrum, the sweeping counts—that is, the first time period T1 and the second time period T2—are adjusted according to a design of an optical system. In a situation where the SN ratio due to the optical system is different between the measurement signal and the reference signal, even if the first time period T1 and the second time period T2 are identical to each other, the SN ratios of the measurement signal and the reference signal in the optical spectrum are mutually different. Meanwhile, in a situation where the SN ratio due to the optical system is the same between the measurement signal and the reference signal, when the measurement signal and the reference signal are adjusted to the same sweeping count, the SN ratios of the measurement signal and the reference signal in the optical spectrum are mutually identical. At this time, when the first time period T1 and the second time period T2 are made identical to each other as in the first example illustrated in FIG. 2, the analysis period of the absorption spectrum of the analysis-target component C1 that is the main analysis target of the spectrometry device 1 becomes 2T1, preventing an increased speed of analysis.

When the above time-divided control is performed even in a situation where it is sufficient to analyze only one among the two different types of analysis-target components C1 and C2, the analysis period of the absorption spectrum of the analysis-target component that is the main analysis target of the spectrometry device 1 is still 2T1. Additionally, components on the emission side and the reception side used for the other analysis-target component that is not analyzed are disposed inside the spectrometry device 1 without being used, and these components are not used effectively.

Therefore, in a situation of analyzing a single analysis-target component, to effectively use the components and shorten the analysis period of the analysis-target component, which is crucial for the spectrometry device 1, the control unit 100 uses a third switching unit 90a and a fourth switching unit 90b that are illustrated in FIG. 1. Moreover, the control unit 100 performs the control and processing illustrated in FIG. 3. Hereinbelow, a configuration and function of the spectrometry device 1 in a situation of analyzing a single analysis-target component, C1, is mainly described. Similar control and processing are executed even in a situation of analyzing C2 as the single analysis-target component.

Referring once again to FIG. 1, the spectrometry device 1 further has the third switching unit 90a and the fourth switching unit 90b. The third switching unit 90a and the fourth switching unit 90b each have any signal switching circuit such as a switch. An input side of the third switching unit 90a is connected to the second reception unit 32. An output side of the third switching unit 90a is connected to the second switching unit 42. An input side of the fourth switching unit 90b is connected to the fourth reception unit 34. An output side of the fourth switching unit 90b is connected to the second switching unit 42. Based on control by the timing adjustment controller 60 of the control unit 100, the third switching unit 90a and the fourth switching unit 90b switch circuits according to whether the second emission unit 12 is operating.

More specifically, when the laser controller 10 starts operation of the second emission unit 12, the timing adjustment controller 60 turns off the third switching unit 90a and separates the second emission unit 32 and the second switching unit 42. Additionally, the timing adjustment controller 60 turns on the fourth switching unit 90b and connects the fourth reception unit 34 and the second switching unit 42. At this time, based on, for example, the above control content described while referring to FIG. 2, the timing adjustment controller 60 controls the first switching unit 41 and the second switching unit 42. That is, the first conversion unit 51 alternately converts the first reception signal S1 and the second reception signal S2 into the digital signal and the second conversion unit 52 alternately converts the third reception signal S3 and the fourth reception signal S4 into the digital signal.

Meanwhile, when the laser controller 10 stops operation of the second emission unit 12, the timing adjustment controller 60 turns on the third switching unit 90a and connects the second reception unit 32 and the second switching unit 42. Additionally, the timing adjustment controller 60 turns off the fourth switching unit 90b and separates the fourth reception unit 34 and the second switching unit 42. At this time, the timing adjustment controller 60 continually connects an input side of the first switching unit 41 to the first reception unit 31. Likewise, the timing adjustment controller 60 continually connects an input side of the second switching unit 42 to the third switching unit 90a. Therefore, the first reception signal S1 output from the first reception unit 31 is input to the first conversion unit 51 through the first switching unit 41. The second reception signal S2 output from the second reception unit 32 is input to the second conversion unit 52 through the third switching unit 90a and the second switching unit 42. That is, the first conversion unit 51 converts the first reception signal S1 into the digital signal and the second conversion unit 52 converts the second reception signal S2 into the digital signal.

Figure 3:
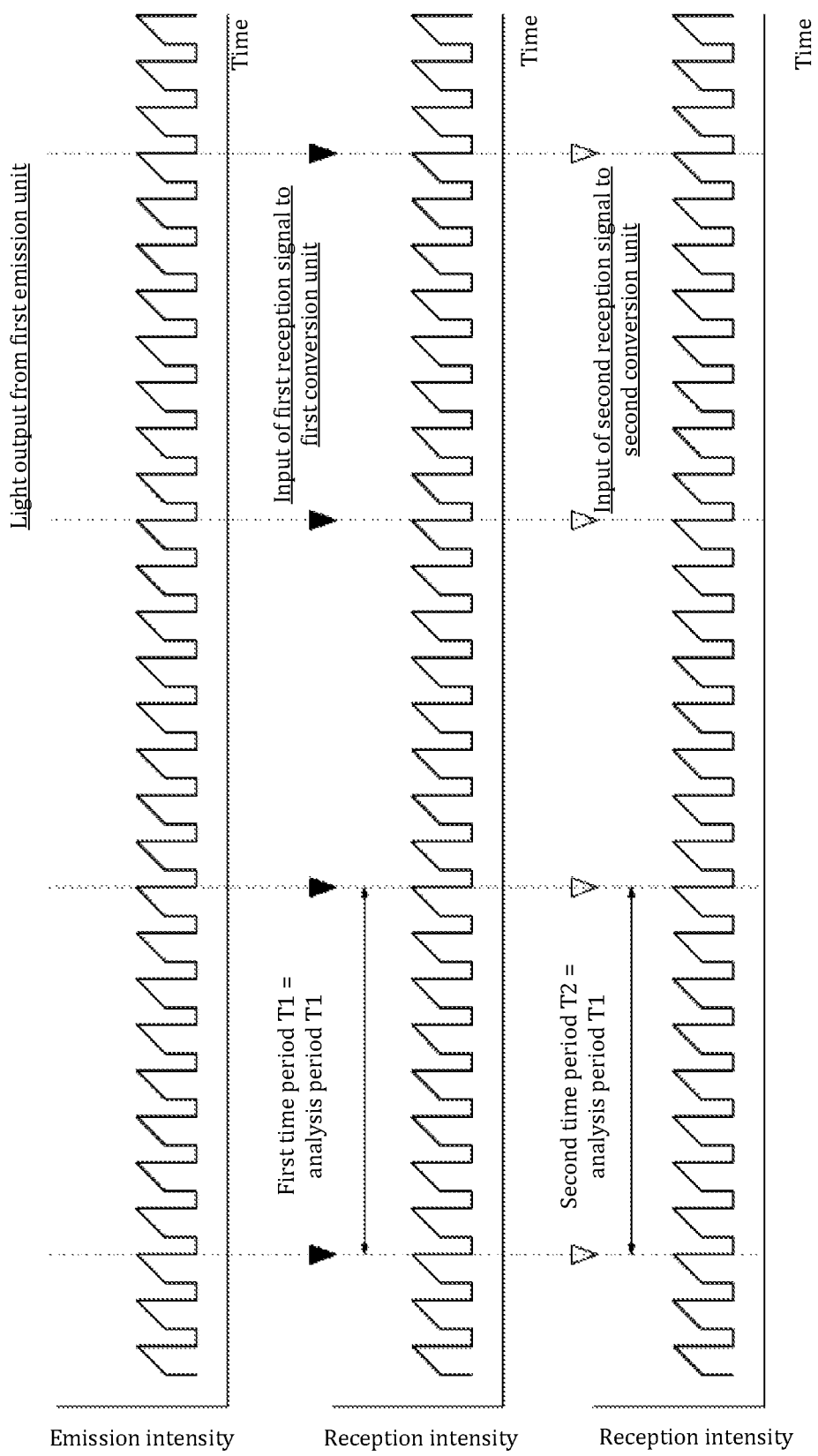
FIG. 3 is a schematic diagram illustrating a second example of the control and processing executed by the control unit.

FIG. 3 is a schematic diagram illustrating a second example of the control and processing executed by the control unit 100. The three graphs in FIG. 3 respectively correspond to the three graphs in FIG. 2 other than the lower graph in FIG. 3 illustrating change over time in input of the second reception signal S2 to the second conversion unit 52.

Unlike the first example in FIG. 2, because the first conversion unit 51 and the second conversion unit 52 can be respectively used with the first reception signal S1 and the second reception signal S2 that are processing targets, there is no need for the timing adjustment controller 60 to perform time division. That is, while operation of the second emission unit 12 is stopped, the timing adjustment controller 60 causes the first conversion unit 51 and the second conversion unit 52 to continuously output the first reception signal S1 and the second reception signal S2, respectively, without controlling the first switching unit 41 and the second switching unit 42 to switch reception signals.

When the first conversion unit 51 converts the first reception signal S1 into the digital signal only for the first time period T1, the CPU 80 analyzes the optical spectrum based on the first reception signal S1 converted during the first time period T1. More specifically, when the timing adjustment controller 60 acquires the first reception signal S1 converted into the digital signal by the first conversion unit 51 only during the first time period T1, the CPU 80 analyzes the absorption spectrum of the analysis-target component C1 based on the acquired first reception signal S1 at the timing indicated by the black upside-down triangle in FIG. 3.

When the second conversion unit 52 converts the second reception signal S2 into the digital signal only for the second time period T2, the CPU 80 analyzes the optical spectrum based on the second reception signal S2 converted during the second time period T2. More specifically, when the timing adjustment controller 60 acquires the second reception signal S2 converted into the digital signal by the second conversion unit 52 only during the second time period T2, the CPU 80 analyzes the absorption spectrum of the gas G1 based on the acquired second reception signal S2 at the timing indicated by the white upside-down triangle in FIG. 3.

In the second example illustrated in FIG. 3, the first time period T1 and the second time period T2 are identical to each other. In this manner, the analysis period of analyzing the absorption spectrum of the analysis-target component C1 and the analysis period of analyzing the absorption spectrum of the gas G1 each become T1 and are identical to each other.

Compared to the first example in FIG. 2, the CPU 80 can analyze the absorption spectrum of the analysis-target component C1 in a state where the analysis period is shortened by T1. Therefore, even in a situation of processing the first reception signal S1 and the second reception signal S2 with regard to the analysis-target component C1, the analysis period of the analysis-target component C1, which is crucial for the spectrometry device 1, is shortened. This improves an analysis efficiency of the analysis-target component C1 by the spectrometry device 1.

Likewise, the CPU 80 can also analyze the absorption spectrum of the gas G1 in a state where the analysis period is shortened by T1. This improves an analysis efficiency of the gas G1 by the spectrometry device 1.

According to the above spectrometry device 1 according to one or more embodiments, product costs can be reduced even in a situation where two emission units are each disposed with a plurality of reception units. More specifically, with the spectrometry device 1, because the reception signals can be processed using only the first conversion unit 51 and the second conversion unit 52 even in a situation where the first emission unit 11 and the second emission unit 12 are disposed with the first reception unit 31 to the fourth reception unit 34, a number of ADC-related circuit components is reduced compared to the prior art, which requires four ADCs.

By independently processing the measurement signal and the reference signal using the first conversion unit 51 and the second conversion unit 52 in a situation where operation of one among the first emission unit 11 and the second emission unit 12 is stopped, the spectrometry device 1 can contribute to increased analysis speed. The spectrometry device 1 can perform a plurality of analyses in parallel based on each continuously acquired reception signal. The spectrometry device 1 can perform real-time analyses of the measurement signal and the reference signal without these interfering with each other by appropriate analysis periods wherein equal SN ratios are obtained according to the design of the optical system.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, dispositions, counts, and the like of each component above are not limited to the content of what is illustrated in the above description and the drawings. The dispositions, counts, and the like of each component may be of any configuration as long as the functions thereof can be realized.

As described above, in one or more embodiments, the first time period T1 and the second time period T2 are described as being identical to each other. However, the present disclosure is not limited thereto. The first time period T1 and the second time period T2 may be different from each other as long as the sweeping counts included in the measurement signal and the reference signal reach the defined numbers respectively required for analysis of the analysis-target components and the gases.

As described above, in one or more embodiments, the description is limited to TDLAS. However, the spectrometry device 1 can be applied to any analyzer that performs spectrometry of any analysis target based on repeated sweeping signals.

As described above, in one or more embodiments, the optical spectrum is described as including the absorption spectrum. However, the present disclosure is not limited thereto. The spectrometry device 1 may analyze the analysis-target components using any spectrometry method other than such an absorption spectrometry method. The spectrometry method may include, for example, fluorescence spectrometry or Raman spectrometry. For example, in fluorescence spectrometry, the optical spectrum includes a fluorescent spectrum. For example, in Raman spectrometry, the optical spectrum includes a Raman spectrum.

As described above, in one or more embodiments, the first reception signal S1 and the third reception signal S3 are described as respectively including the optical-spectrum information relating to the analysis-target components C1 and C2 and the second reception signal S2 and the fourth reception signal S4 are described as respectively including the optical-spectrum information relating to the reference gases G1 and G2. However, the present disclosure is not limited thereto. Each reception signal may include optical-spectrum information relating to any target. For example, new analysis-target components may be respectively enclosed instead of the reference gases G1 and G2 and the second reception signal S2 and the fourth reception signal S4 may also include optical-spectrum information relating to the analysis-target components like the first reception signal S1 and the third reception signal S3.

1 Spectrometry device
10 Laser controller
11 First emission unit
12 Second emission unit
21 First reference cell
22 Second reference cell
31 First reception unit
32 Second reception unit
33 Third reception unit
34 Fourth reception unit
41 First switching unit
42 Second switching unit
51 First conversion unit
52 Second conversion unit
60 Timing adjustment controller
71 First storage unit
72 Second storage unit
73 Third storage unit
74 Fourth storage unit
80 CPU
90a Third switching unit (switching unit)
90b Fourth switching unit (switching unit)
100 Control unit
C1, C2 Analysis-target component
G Gas to be measured
G1, G2 Gas
S1 First reception signal
S2 Second reception signal
S3 Third reception signal
S4 Fourth reception signal
T1 First time period
T2 Second time period
T3 Third time period
T4 Fourth time period

What is claimed is:

1. A spectrometry device, comprising:
a first converter that processes a reception signal based on an irradiation light from a first emitter;
a second converter that processes a reception signal based on an irradiation light from a second emitter; and
a controller that controls the first emitter and the second emitter, wherein
the reception signal based on the irradiation light irradiated from the first emitter includes a first reception signal and a second reception signal that each include information that relates to an optical spectrum, and when the controller stops the operation of the second emitter, the first converter converts the first reception signal into a first digital signal and the second converter converts the second reception signal into a second digital signal.

2. The spectrometry device of claim 1, wherein when the first converter converts the first reception signal into the first digital signal during a first time period, the controller analyzes the optical spectrum based on the first reception signal converted during the first time period.

3. The spectrometry device of claim 2, wherein when the second converter converts the second reception signal into the second digital signal during a second time period, the controller analyzes the optical spectrum based on the second reception signal converted during the second time period.

4. The spectrometry device of claim 3, wherein the first time period and the second time period are identical.

5. The spectrometry device of claim 1, further comprising:
a switch that switches a circuit that causes the first converter to alternately convert the first reception signal and the second reception signal into the first and second digital signals, respectively, when the controller starts the operation of the second emitter.

6. The spectrometry device of claim 1, wherein
the first reception signal includes information that relates to an absorption spectrum of an analysis-target component in a gas to be measured, and
the second reception signal includes information on an absorption spectrum of a gas that is identical to the analysis-target component and has a known concentration.

7. The spectrometry device of claim 2, further comprising:
a switch that switches a circuit that causes the first converter to alternately convert the first reception signal and the second reception signal into the first and second digital signals, respectively, when the controller starts the operation of the second emitter.

8. The spectrometry device of claim 3, further comprising:
a switch that switches a circuit that causes the first converter to alternately convert the first reception signal and the second reception signal into the first and second digital signals, respectively, when the controller starts the operation of the second emitter.

9. The spectrometry device of claim 4, further comprising:
a switch that switches a circuit that causes the first converter to alternately convert the first reception signal and the second reception signal into the first and second digital signals, respectively, when the controller starts the operation of the second emitter.

10. The spectrometry device of claim 2, wherein
the first reception signal includes information that relates to an absorption spectrum of an analysis-target component in a gas to be measured, and
the second reception signal includes information on an absorption spectrum of a gas that is identical to the analysis-target component and has a known concentration.

11. The spectrometry device of claim 3, wherein
the first reception signal includes information that relates to an absorption spectrum of an analysis-target component in a gas to be measured, and
the second reception signal includes information on an absorption spectrum of a gas that is identical to the analysis-target component and has a known concentration.

12. The spectrometry device of claim 4, wherein
the first reception signal includes information that relates to an absorption spectrum of an analysis-target component in a gas to be measured, and
the second reception signal includes information on an absorption spectrum of a gas that is identical to the analysis-target component and has a known concentration.

13. The spectrometry device of claim 5, wherein
the first reception signal includes information that relates to an absorption spectrum of an analysis-target component in a gas to be measured, and
the second reception signal includes information on an absorption spectrum of a gas that is identical to the analysis-target component and has a known concentration.

* * * * *